US006972873B1

(12) United States Patent
Usui et al.

(10) Patent No.: US 6,972,873 B1
(45) Date of Patent: Dec. 6, 2005

(54) HALFTONING METHOD AND APPARATUS, AND COMPUTER-READABLE RECORDING MEDIUM IN WHICH HALFTONING PROGRAM IS RECORDED

(75) Inventors: Nobuaki Usui, Kawasaki (JP); Tetsuo Asano, Kanazawa (JP)

(73) Assignee: Fujitsu Limited, Kawasaki (JP)

( * ) Notice: Subject to any disclaimer, the term of this patent is extended or adjusted under 35 U.S.C. 154(b) by 856 days.

(21) Appl. No.: 09/667,439

(22) Filed: Sep. 22, 2000

(30) Foreign Application Priority Data

Nov. 30, 1999 (JP) .................................. 11-340255

(51) Int. Cl.[7] .......................... H04N 1/405; H04N 1/409
(52) U.S. Cl. ..................................... 358/3.04; 358/3.26
(58) Field of Search ........................ 358/1.9, 2.1, 3.01, 358/3.04, 3.03, 3.21, 3.26, 3.05; 382/276, 382/304, 173, 260, 252

(56) References Cited

U.S. PATENT DOCUMENTS

| 4,654,721 | A | | 3/1987 | Goertzel et al. ............ 358/3.04 |
| 4,876,610 | A | | 10/1989 | Ohsawa et al. ............ 358/3.05 |
| 4,878,125 | A | | 10/1989 | Katayama et al. ......... 358/3.03 |
| 4,955,065 | A | | 9/1990 | Ulichney ................... 358/3.03 |
| 5,051,844 | A | | 9/1991 | Sullivan .................... 358/3.03 |
| 5,140,432 | A | * | 8/1992 | Chan ......................... 358/3.03 |
| 5,201,013 | A | * | 4/1993 | Kumagai .................... 382/270 |
| 6,026,199 | A | * | 2/2000 | Sommer ..................... 358/3.03 |
| 6,427,030 | B1 | * | 7/2002 | Williams et al. ............ 382/252 |

FOREIGN PATENT DOCUMENTS

| EP | 474 985 A2 | 3/1992 |
| EP | 696 129 A2 | 2/1996 |
| EP | 734 150 A2 | 9/1996 |
| EP | 837 598 A1 | 4/1998 |
| JP | 58-189641 | 11/1983 |
| JP | 06-006586 | 1/1994 |
| JP | 06-070144 | 3/1994 |
| JP | 07-274015 | 10/1995 |

OTHER PUBLICATIONS

"Multiple Error Correction Algorithm for Halftone, Continuous Tone and Text Reproduction", S.J. Fox, et al., IBM Technical Disclosure Bulletin, vol. 23, No. 10, Mar. 1981 (pps. 4433-4435).

* cited by examiner

*Primary Examiner*—Scott A. Rogers
(74) *Attorney, Agent, or Firm*—Staas & Halsey LLP

(57) ABSTRACT

A halftoning apparatus free of the occurrence of moiré and other artifacts under a simple technique. In the apparatus, a binarizing section converts the multilevel value of a given noteworthy pixel of the multilevel input image into a binary value while pixels of the input image are scanned successively, an error diffusing section diffuses an occurred error in binary value with respect to the noteworthy pixel to unscanned pixels adjacent to the noteworthy pixel by one diffusion technique, and an error diffusion technique changing section changes the diffusion technique to another in accordance with a predetermined manner as the scanning of the successive pixels of the multilevel input image progresses.

26 Claims, 14 Drawing Sheets

| 0 | −1 | 0 |
|---|----|---|
| −1 | 4 | −1 |
| 0 | −1 | 0 |

(b)

| 1 | −2 | 1 |
|---|----|---|
| −2 | 4 | −2 |
| 1 | −2 | 1 |

FIG. 5

(a) $\sqrt{\begin{pmatrix} 1 & 0 & -1 \\ 1 & 0 & -1 \\ 1 & 0 & -1 \end{pmatrix}^2 + \begin{pmatrix} 1 & 1 & 1 \\ 0 & 0 & 0 \\ -1 & -1 & -1 \end{pmatrix}^2}$ (b) $\sqrt{\begin{pmatrix} -1 & 0 & 1 \\ -1 & 0 & 1 \\ -1 & 0 & 1 \end{pmatrix}^2 + \begin{pmatrix} -1 & -1 & -1 \\ 0 & 0 & 0 \\ 1 & 1 & 1 \end{pmatrix}^2}$ (a)

WEIGHTING FACTOR = 1/42
● :NOTEWORTHY PIXEL (b)

HALFTONING METHOD AND APPARATUS, AND COMPUTER-READABLE RECORDING MEDIUM IN WHICH HALFTONING PROGRAM IS RECORDED

BACKGROUND OF THE INVENTION

1. Field of the Invention

The present invention relates to a halftoning method and apparatus for converting a multilevel input image, such as a continuous-tone color image, into a binary image, and also to a computer-readable recording medium in which a halftoning program is recorded.

2. Description of the Related Art

For reproducing a tone-graduation image (e.g., multilevel image and continuous-tone color image) on a printer that is dedicated to binary outputting, it is necessary to convert values of the multilevel image into binary values. The binary-type printer realizes reproduction of tone graduation by modification in terms of dot area or dot density. In the following description, the terms "binary-digitizing" and "halftoning" are used each as a word having a meaning "converting a multilevel image into a binary image".

Consequently, in such halftoning, it has been required to make moiré and artifacts, which does not appear in the original image (multilevel image), unconscious and also to reproduce the tone graduation of the original image with the best possible fidelity.

The conventional halftoning technology is exemplified by the following:

(1) Japanese Patent Laid-Open Publication No. HEI 6-070144 (Application No. HEI 5-142746) discloses an attempt to realize a moiré- or artifact-free binary image by carrying out the error diffusion method along "a random spatial filling two-dimensional curve" throughout the entire original image.

(2) Japanese Patent Laid-Open Publication No. HEI 6-006586 discloses an alternative attempt to realize a moiré- or artifact-free binary image by minimizing energy functions that are calculated from values of the original image (multilevel image) and those of a binary image, utilizing the "simulated annealing method". As this method two technique are currently known; one technique is to directly converting values of the original image, and the other technique is to previously obtain 256-grade dither patterns prior to converting values of the original image.

(3) Japanese Patent Laid-Open Publication No. HEI 7-274015 discloses a concept of classifying the original image in terms of attributes, such as characters and a natural image, and then selectively changing the gradation conversion method and the area conversion method in accordance with the individual attribute.

However, these conventional technologies would encounter the following problems:

(1) In the technology disclosed in Japanese Patent Laid-Open Publication No. HEI 6-070144, because the entire image is processed by the same algorithm, moiré or artifacts would be inevitable with the converted binary image. Further, during converting, since "the random spatial filling two-dimensional curve" can scan the entire image as if drawing with a single continuous stroke, it is impossible to take a parallel calculation, requiring huge processing time.

(2) In the technology disclosed in Japanese Patent Laid-Open Publication No. HEI 6-006586, because huge time is needed in calculation during converting, this technique would be less useful. As another disadvantage, in reduction of a very gentle tone-gradation image, a peculiar artifact would occur.

(3) In the technology disclosed in Japanese Patent Laid-Open Publication No. HEI 7-274015, because processing takes place by the same algorithm within the same natural image, there is nothing to prevent an artifact, if occurred, or even to make it unconscious. As another problem with this technology, if the original image contains an attribute named "characters", a halftoning process dedicated to the characters takes place. But once imaging such as by a logical operation was performed, the character-dedicated halftoning process can no longer be done.

Consequently a simple, speedy halftoning process has been cherished without causing moiré or artifacts.

SUMMARY OF THE INVENTION

With the foregoing problems in view, an object of the present invention is to provide a halftoning method which enables reduction of moiré or other artifacts surely to a minimum by a simple technique.

Another object of the invention is to provide an apparatus for carrying out the above-mentioned halftoning method.

Still another object of the invention is to provide a computer-readable recording medium in which a halftoning program is stored.

In order to accomplish the above first-named object, according to a first generic feature of the present invention, there is provided a halftoning method of converting a multilevel input image into a binary image, comprising the steps of: converting the multilevel value of a given noteworthy pixel of the multilevel input image into a binary value while pixels of the multilevel input image are scanned successively; diffusing a possible error, which has occurred in binary value with respect to the noteworthy pixel, to unscanned pixels adjacent to the noteworthy pixel by one diffusion technique; and changing the technique of the diffusing to another in accordance with a predetermined manner as the scanning of the successive pixels of the multilevel input image progresses.

The method may further comprise a step of discriminating whether or not the noteworthy pixel is a pixel that constitutes part of a profile of the multilevel input image. If the result of this discriminating is positive, the error diffusion technique is changed from one to another.

The method may still further comprises a step of detecting the direction in which the profile of the multilevel input image extends with respect to the noteworthy pixel. If the result of this discriminating is positive, values according to the occurred error are added to the values of the unscanned pixels along the profile in the detected direction as an exceptional process when the error diffusion technique is changed.

As a preferred feature, the error diffusion technique is changed for every pixel of the multilevel input image. The method may further comprises the steps of discriminating whether or not the noteworthy pixel is a pixel constituting part of a profile of the multilevel input image, and detecting the direction in which the profile of the multilevel input image extends with respect to the noteworthy pixel. If the result of this discriminating is positive, values according to the occurred error are added to the values of the unscanned pixels along the detected direction of the profile as an exceptional process when the error diffusion technique is changed.

As another preferred feature, the profile discriminating is carried out by calculating a profile value of the noteworthy pixel based on both the multilevel value of the noteworthy pixel and those of the adjacent pixels, and comparing the calculated profile value with a predetermined value.

As still another preferred feature, in the profile discriminating step, a two-dimensional digital filter dedicated to enhancing the profile is used in the calculating of the profile value. The two-dimensional digital filter dedicated to enhancing the profile may be a Laplacian filter or a Prewitt filter.

Alternatively, the profile value may be directly calculated by making addition and subtraction individually on the multilevel values of the noteworthy pixel and the adjacent pixels.

As a further preferred feature, the error diffusion technique may be changed to another that is selected in a predetermined order, or at random, from a plurality of error diffusion techniques.

As a still further preferred feature, the error diffusion technique may be a technique of proportionally distributing the occurred error to the plural unscanned pixels adjacent to the noteworthy pixel in accordance with the predetermined weighting pattern, and the error diffusion technique may be changed by changing the predetermined weighting pattern to another.

Furthermore, if a plurality of multilevel input images to be halftoned have an approximate profile, the discriminating is carried out for only one of the plural multilevel input images, and the result of the discriminating can be used in halftoning the remaining multilevel input images.

The above second-named object is accomplished by an halftoning apparatus for converting a multilevel input image into a binary image, comprising: a binarizing section for converting the multilevel value of a given noteworthy pixel of the multilevel input image into a binary value while pixels of the multilevel input image are scanned successively; an error diffusing section for diffusing a possible error, which has occurred in binary value with respect to the noteworthy pixel, to unscanned pixels adjacent to the noteworthy pixel by one diffusion technique; and an error diffusion technique changing section for changing the diffusion technique to another in accordance with a predetermined manner as the scanning of the successive pixels of the multilevel input image progresses.

The apparatus may further comprise a pixel-on-profile detection section for discriminating whether or not the noteworthy pixel is a pixel that constitutes part of a profile of the multilevel input image. If the result of the discrimination is positive, the error diffusion technique changing section changes the error diffusion technique from one to another.

The apparatus may still further comprises a direction-of-profile detection section for detecting the direction in which the profile of the multilevel input image extends with respect to the noteworthy pixel. If the result of the discriminating is positive, the error diffusing section performs an exceptional process of adding values according to the occurred error to the values of the unscanned pixels along the detected direction of the profile. In an alternative form the error diffusion technique changing section may change the error diffusion technique for every pixel of the multilevel input image.

The apparatus may further comprise a pixel-on-profile detection section for discriminating whether or not the noteworthy pixel is a pixel that constitutes part of a profile of the multilevel input image, and a direction-of-profile detection section for detecting the direction in which the profile of the multilevel input image extends. If the result of the discrimination is positive, the error diffusing section performs an exceptional process of adding values according to the occurred error to the values of the unscanned pixels along the detected direction of the profile.

The above third-named object is accomplished by a computer-readable recording medium in which a halftoning program for instructing a computer to execute a function of converting a multilevel input image into a binary image is recorded, wherein the halftoning program instructs the computer to function as the following: a binarizing section for converting the multilevel value of a given noteworthy pixel of the multilevel input image into a binary value while pixels of the multilevel input image are scanned successively; an error diffusing section ford if fusing a possible error, which has occurred in binary value with respect to the noteworthy pixel, to unscanned pixels adjacent to the noteworthy pixel by one diffusion technique; and an error diffusion technique changing section for changing the diffusion technique of the diffusing to another in accordance with a predetermined manner as the scanning of the successive pixels of the multilevel input image progresses.

The halftoning program may further instruct the computer to function also as a pixel-on-profile detection section for discriminating whether or not the noteworthy pixel is a pixel that constitutes part of a profile of the multilevel input image, and if the result of the discrimination is positive, the halftoning program instructs the computer in such a manner that the error diffusion technique changing section changes the error diffusion technique from one to another.

Further, the halftoning program may instruct the computer to function also as a direction-of-profile detection section for detecting the direction in which the profile of the multilevel input image extends with respect to the noteworthy pixel, and if the result of the discriminating is positive, the halftoning program instructs the computer in such a manner that the error diffusing section performs an exceptional process of adding values according to the occurred error to the values of the unscanned pixels along the detected direction of the profile.

In addition, the halftoning program may instruct the computer in such a manner that the error diffusion technique changing section changes the error diffusion technique for every pixel of the multilevel input image. The halftoning program may further instruct the computer to function also as a pixel-on-profile detection section for discriminating whether or not the noteworthy pixel is a pixel constituting part of a profile of the multilevel input image, and a direction-of-profile detection section for detecting the direction in which the profile of the multilevel input image extends, and if the result of the discrimination is positive, the halftoning program instructs the computer in such a manner that the error diffusing section performs an exceptional process of adding values according to the occurred error to the values of the unscanned pixels along the detected direction of the profile.

According to the halftoning method and apparatus, and the computer-readable recording medium of the present invention, it is possible to guarantee the following advantageous results:

(1) Since an error diffusion technique is changed to another as the scanning of the successive pixels of the multilevel input image progresses, it is possible to minimize moiré and artifacts in the binary image, which did not appear in the original (multilevel) image.

(2) Since the error diffusion technique is changed from one to another upon detection that the noteworthy pixel is a pixel constituting part of the profile of the multilevel input image, it is possible to localize the effects (i.e., moiré or other artifacts) that have been caused by the change of the error diffusion technique to dissolve into the profile, thus minimizing moiré and artifacts in the binary image, which did not appear in the original (multilevel) image.

(3) The change of the error diffusion technique for every pixel of the multilevel input image would also minimize moiré and artifacts in the binary image, which did not appear in the original (multilevel) image.

(4) Upon judgment that the noteworthy pixel is a pixel constituting part of the profile of the multilevel input image, values according to the possible error, which has occurred in the binary value with respect to the noteworthy pixel, are added to the values of the unscanned pixels along the profile in the detected direction as an exceptional process. This would also make it possible to minimize moiré and artifacts in the binary image, which did not appear in the original (multilevel) image.

(5) Since the profile value of the noteworthy pixel is calculated based on both the multilevel value of the noteworthy pixel and those of the adjacent pixels and then compared with a predetermined value, it is possible to facilitate discriminating the profile. Further, the profile discrimination can be carried out simultaneously with the scanning of the multilevel image, thus speeding up the profile detection.

(6) With a two-dimensional digital filter dedicated to enhancing the profile such as a Laplacian filter or a Prewitt filter in calculating the profile value, it is possible to facilitate discriminating the profile.

(7) The profile value can be directly calculated by making addition and subtraction individually on the multilevel values of the noteworthy pixel and the adjacent pixels. Since the profile value can thus be calculated without making any multiplication or division, it is possible to decrease the load of the calculation, thereby speeding up the calculation of the profile value.

(8) Since the error diffusion technique can be changed to another that is selected in a predetermined order from a plurality of error diffusion techniques, it is possible to minimize moiré and artifacts in the binary image, which did not appear in the original (multilevel) image.

(9) Since the error diffusion technique can be changed to another that is selected at random from a plurality of error diffusion techniques, it is possible to minimize moiré and artifacts in the binary image, which did not appear in the original (multilevel) image.

(10) Partly since the occurred error is proportionally distributed to the plural unscanned pixels adjacent to the noteworthy pixel in accordance with the predetermined weighting pattern, and partly since the error diffusion technique can be changed by changing the predetermined weighting pattern to another, it is possible to change the error diffusion technique easily and stably.

(11) If a plurality of multilevel input images to be halftoned have an approximate profile, a discrimination is made, for only one of the plural multilevel input images, whether or not the noteworthy pixel is a pixel constituting part of the profile. And the result of the discriminating can be used in halftoning the remaining multilevel input images. It is therefore possible to halftone the plural multilevel input images without making this discrimination for the remaining multilevel input images, thus improving the practical speed of halftoning.

Other objects and further features of the present invention will be apparent from the following detailed description when read in conjunction with the accompanying drawings.

BRIEF DESCRIPTION OF THE DRAWINGS

FIGS. 4, (a) and (b), is a diagram illustrating a Laplacian filter;

FIGS. 5, (a) and (b), is a diagram illustrating a Prewitt filter;

DESCRIPTION OF THE PREFERRED EMBODIMENT(S)

One preferred embodiment of the present invention will now be described with reference to the accompanying drawings.

Figure 2:
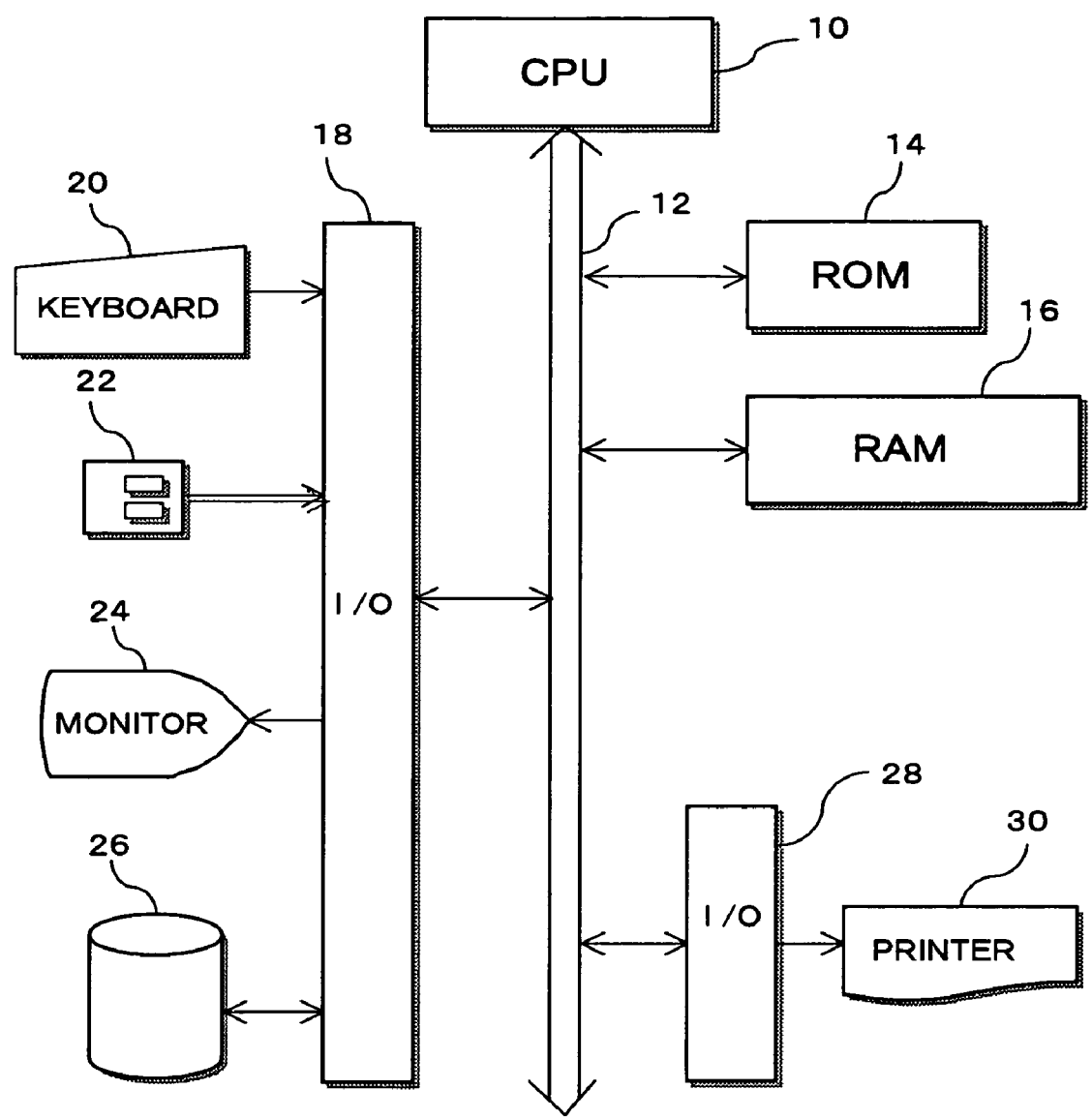
FIG. 2 is a block diagram showing a computer system on which the halftoning apparatus of FIG. 1 is realized.

FIG. 2 is a block diagram showing a computer system which realizes a halftoning apparatus according to one embodiment of the present invention. As shown in FIG. 2, the computer system of the present embodiment includes a CPU 10, and a bus line 12 connected to the CPU 10.

A ROM 14 and a RAM 16 are connected to the bus line 12. Also a keyboard 20, a mouse 22, a monitor (such as CRT, LCD, PDP) 24, and a magnetic disc 26 are connected to the bus line 12 via an input/output interface (I/O) 18. Still also a printer 30 is connected to the busline 12 via another input/output interface (I/O) 28.

And an application program is stored in RAM 16 which realizes a binarizing section 51, an error diffusing section 52, an error diffusing technique changing section 53, a pixel-on-profile detection section 54, and a direction-of-profile detection section 55 on the CPU 10. As it executes the application program read out from RAM 16 via the bus line 12, the CPU 10 functions (described in detail later) as the binarizing section 51, the error diffusing section 52, the error diffusing technique changing section 53, the pixel-on-profile detection section 54, and the direction-of-profile detection section 55, thus realizing the halftoning apparatus of the present embodiment.

The program, which instructs the CPU 10 to function as the binarizing section 51, the error diffusing section 52, the error diffusing technique changing section 53, the pixel-on-profile detection section 54, and the direction-of-profile detection section 55, is previously recorded in a computer-readable recording medium in the form of a floppy disc or a CD-ROM. In use, the computer reads out the program from the recording medium, and stores the read-out program into an internal storage device or an external storage device. Alternatively the program may be stored in a storage device, such as a magnetic disc, an optical disc or a magneto-optical disc, whereupon the program may be provided from the storage device to the computer over a communications channel or path.

When realizing the functions of the binarizing section 51, the error diffusing section 52, the error diffusing technique changing section 53, the pixel-on-profile detection section 54, and the direction-of-profile detection section 55, the program newly stored in the internal storage device (RAM 16 in the present embodiment) is executed by a microprocessor (CPU 10 in the present embodiment) of the computer. Alternatively the computer may directly read out the program from the recording medium for this execution.

In the present embodiment, the term "computer" is hardware and an operation system inclusive, meaning hardware operable under the control of an operation system. Assuming that the application program solely operates hardware in the absence of an operation system, such hardware itself is regarded as an equivalent to a computer. Accordingly hardware includes at least a microprocessor, such as CPU, and a read-out device for reading out a computer program recorded in a recording medium.

The application program includes program codes for instructing the computer to function as the binarizing section 51, the error diffusing section 52, the error diffusing technique changing section 53, the pixel-on-profile detection section 54, and the direction-of-profile detection section 55. Alternatively, part of these functions may be realized by the operation system rather than the application program.

Further, the recording medium of the present embodiment may be in the form of one selected from various kinds of computer-readable media that are exemplified by a floppy disc, CD-ROM, a magnetic disc, an optical disc, a magneto-optical disc, an IC card, a ROM cartridge, a magnetic tape, a punch card, an internal or external storage device (memory such as RAM or ROM) of a computer, and printed matter printed or otherwise labeled with codes such as bar codes.

Figure 1:
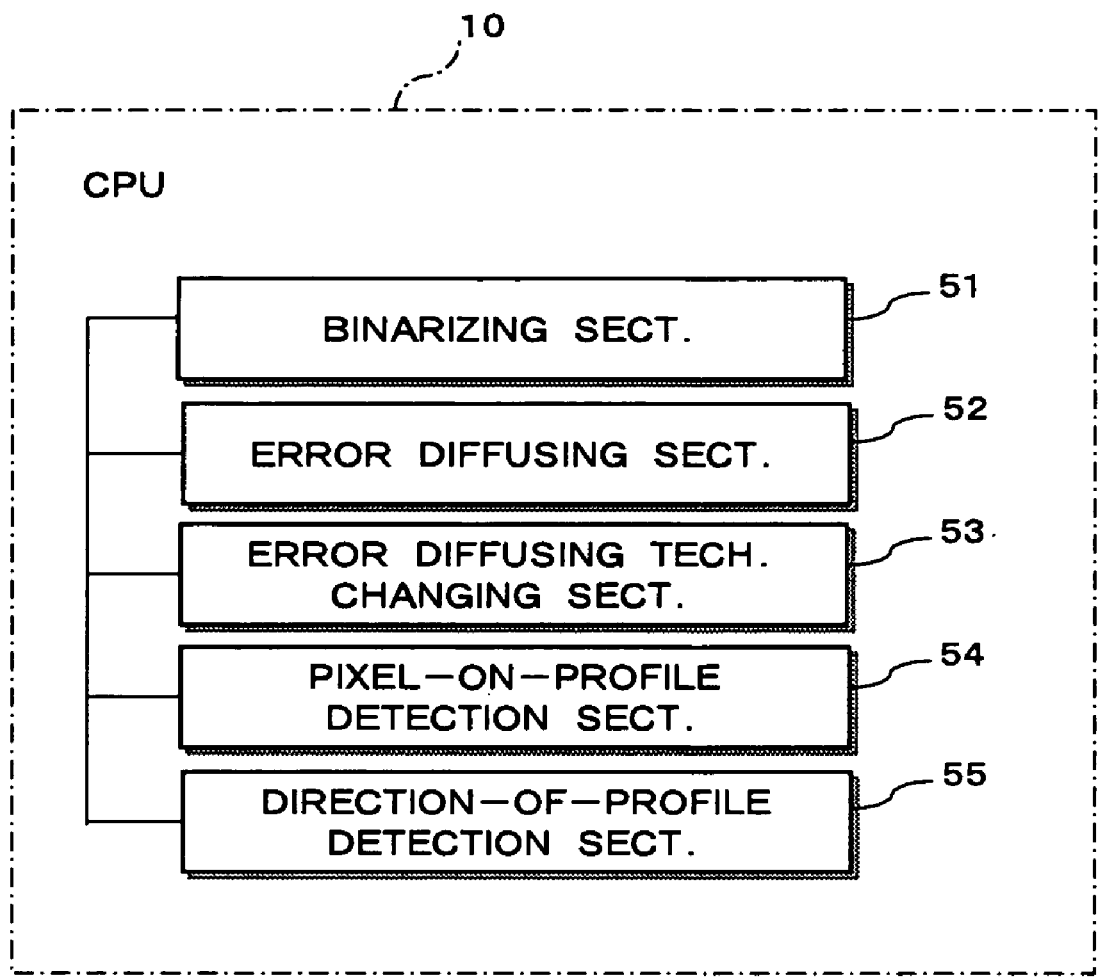
FIG. 1 is a block diagram showing a functional construction of a halftoning apparatus according to one embodiment of the present invention.

The computer system of the present embodiment shown in FIG. 2 functions as the halftoning apparatus which converts a multilevel input image into a binary image. As shown in FIG. 1, the computer system functions as the binarizing section 51, the error diffusing section 52, the error diffusing technique changing section 53, the pixel-on-profile detection section 54, and the direction-of-profile detection section 55.

Figure 3:
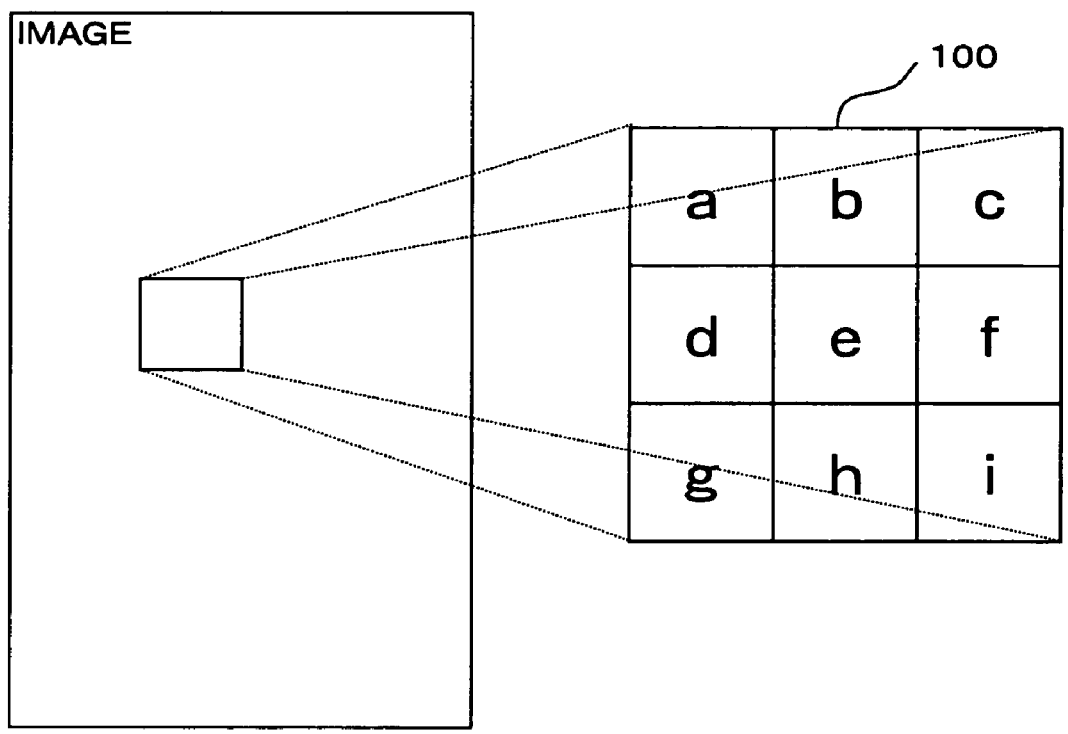
FIG. 3 is a diagram illustrating the manner in which a two-dimensional digital filter dedicated to enhancing the profile is used.

FIG. 1 is a block diagram showing a functional construction of the halftoning apparatus of the present embodiment. FIG. 3 is a diagram illustrating the manner in which a two-dimensional digital filter dedicated to enhancing the profile is used.

The halftoning apparatus of the present embodiment first expands image data of a multilevel input image on the memory (RAM 16) or the like. Then scanning the image data using an odd-number-by-odd-number matrix (a 3×3 matrix in the present embodiment) as shown in FIG. 3, the halftoning apparatus binarizes the multilevel image data for every noteworthy pixel (a pixel value e in FIG. 3), which is located at the center of this matrix 100, to determine whether to turn the dot on or off.

In the present embodiment, each pixel to be binarized is defined as having a pixel value in a range of from 0 to 255, having a pixel value of either 0 or 255 after halftoned (binarized). This definition would never affect the generality of description.

Scanning pixels (original pixels) constituting the multilevel input image, the binarizing section 51 converts the multilevel value of a noteworthy pixel currently under scanning into a binary value. Specifically, the multilevel value of the noteworthy pixel (pixel value: e) is compared with a predetermined value or threshold (e.g., 128); if the pixel value e of the noteworthy pixel is equal to or larger than the predetermined value (e≧128), 255 (ON) is recorded as the value of the noteworthy pixel in a predetermined area of the RAM 16 or the magnetic disc 26. The pixel value of the noteworthy pixel obtained after binarizing is designated by e'.

To the contrary, if the pixel value e of the noteworthy pixel is smaller than the predetermined value (e<128), 0 (OFF) is recorded as the pixel value e' of the noteworthy pixel in a designated area of the RAM 16 or the magnetic disc 26.

The pixel-on-profile detection section 54 discriminates whether or not the noteworthy pixel is a pixel that constitutes part of a profile of the multilevel input image (for convenience to describe, this discrimination will hereinafter occasionally be called "profile detection"). The pixel-on-profile detection section 54 calculates a profile value E of the noteworthy pixel based on both the multilevel value of the noteworthy pixel and those of the adjacent pixels, using a Laplacian filter or a Prewitt filter or by making addition and subtraction individually on the multilevel values of the noteworthy pixel and the adjacent pixels.

Then the thus obtained profile value E is compared with the predetermined value or threshold T to discriminate whether or not the noteworthy pixel is the pixel that constitutes part of the profile of the multilevel input image.

The threshold T, which can be set by an operator, plays as a parameter to control the degree of enhancement of the profile.

Figure 4:
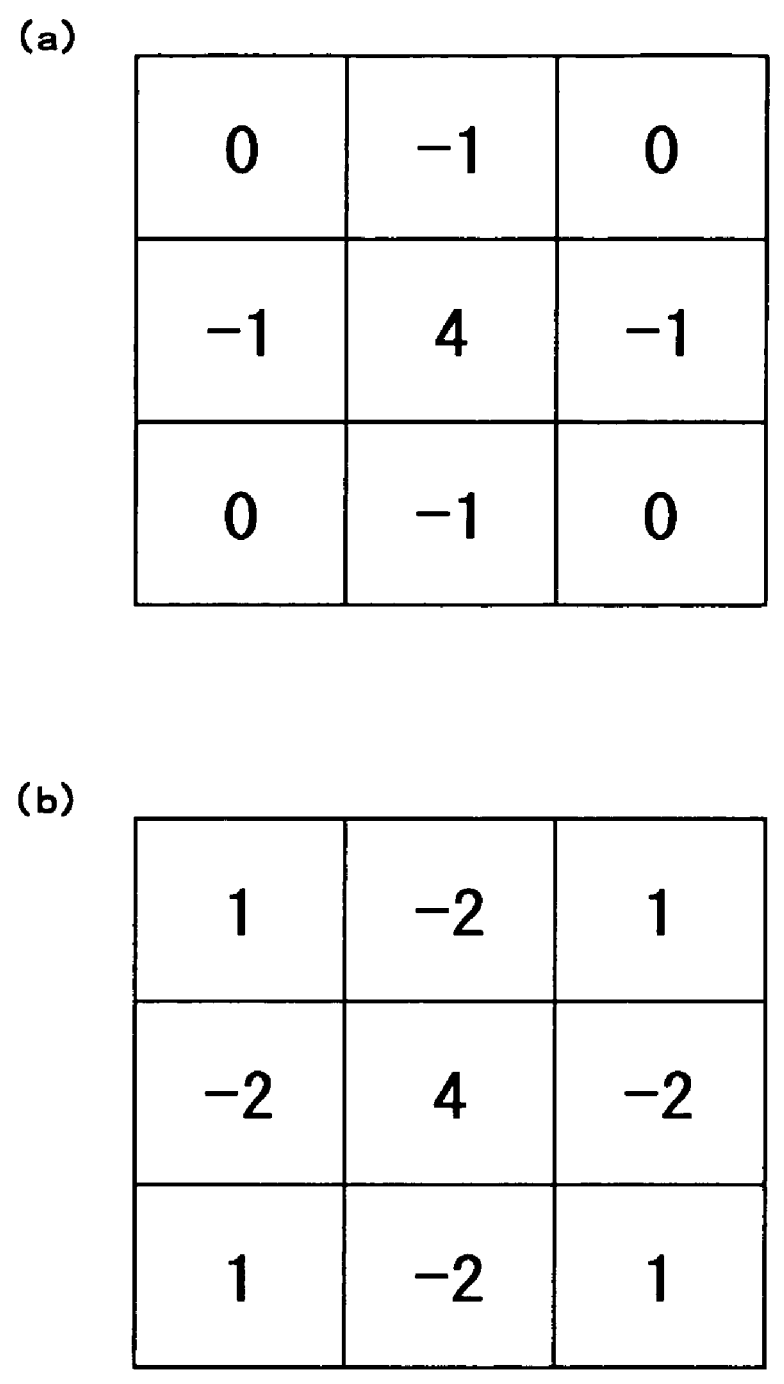

FIGS. 4 and 5 show two-dimensional digital filters dedicated to enhancing the profile. Specifically, FIGS. 4, (a) and (b), illustrates Laplacian filters; FIGS. 5, (a) and (b), Prewitt filters.

When the two-dimensional digital filter dedicated to enhancing the profile is used to calculate the profile value E with respect to the noteworthy pixel, both the multilevel value of the noteworthy pixel and those of the adjacent pixels in the matrix 100 of FIGS. 3 (a, b, c, d, f, g, h, i in FIG. 3) are applied to the two-dimensional digital filter dedicated to enhancing the profile (e.g., Laplacian filter or Prewitt filter), which filter is shown in FIGS. 4, (a) and (b), and FIGS. 5, (a) and (b).

For example, when the Laplacian filter of FIG. 4(a) is used, the profile value E is given by $$E=(a\times 0)+\{b\times(-1)\}+(c\times 0)+\{d\times(-1)\}+(e\times 4)+\{f\times(-1)\}+(g\times 0)+\{h\times(-1)\}+(i\times 0).$$

Also when using the Laplacian filter of FIG. 4 (b), the profile value E can be obtained likewise.

In the illustrated embodiment, two types of Laplacian filters of FIGS. 4, (a) and (b), are used. The present invention should by no means be limited to this illustrated examples, and alternative Laplacian filters having other patterns may be used. Specifically, as long as it satisfies all the following conditions (1) through (4), any two-dimensional digital filter dedicated to enhancing the profile can give the same results as those with a Laplacian filter. Here, alphabetical characters a through i designate pixel values each corresponding to a respective pixel value in the matrix 100 of FIG. 3.

(1) |e|=|a+b+c+d+f+g+h+i|

(2) The sign of e is opposite to that of b, d, f, h.

(3) The sign of e is the same as that of a, c, g, i; or a=c=g=i=0.

(4) In the matrix 100 (FIG. 3), the values each obtained by multiplying the distance between the noteworthy pixel (the pixel value e) and each of the adjacent pixels (pixel values a, b, c, d, f, g, h, i) by |a|, |b|, |c|, |d|, |f|, |g|, |h|, |i|, respectively, become close to one another in largeness of digit (except that a, c, g, i=0).

Therefore, by employing the Laplacian filter of FIGS. 4, (*a*) and (*b*) or any of two-dimensional digital filters dedicated to enhancing the profile that satisfy all the foregoing conditions (1) through (4), it is possible to discriminate whether or not the noteworthy pixel is a pixel on the profile of the image.

The manner in which the profile value E is calculated using the Prewitt filter of FIGS. 5, (*a*) and (*b*) will now be described. In an example using the Prewitt filter of (*a*) of FIG. 5, the profile value E is given by $$E=[[(a\times1)+(b\times0)+(c\times(-1))+(d\times1)+(e\times0)+(f\times(-1))+ \\ (g\times1)+(h\times0)+(i\times(-1))]^2+[(a\times1)+(b\times1)+(c\times1)+ \\ (d\times0)+(e\times0)+(f\times0)+(g\times(-1))+(h\times(-1))+ \\ (i\times(-1))]^2]^{1/2}$$

Also in another example using the Prewitt filter of (*b*) of FIG. 5, the profile value E is obtained in the same way.

The greater the variation among the pixel values of the noteworthy pixel and the adjacent pixels, the greater the profile value E will be obtained.

Then the pixel-on-profile detection section 54 compares the thus obtained profile value E with the predetermined threshold T. If the profile value E is greater than the threshold T, it is judged that the noteworthy pixel (the pixel value e) is a pixel on the profile of the image; this is, the profile has been detected.

The direction-of-profile detection section 55 detects the direction in which the profile of the multilevel input image extends with respect to the noteworthy pixel. The manner in which the direction-of-profile detection section 55 detects the direction of the profile will be described with reference to FIG. 6, which illustrates various profile directions.

The direction-of-profile detection section 55 makes the following calculations using the pixel values a, b, c, d, e, f, g, h, i in the matrix 100 (see FIG. 3), which centers the noteworthy pixel.

$X_1=b+e+h$ $X_2=c+e+g$ $X_3=a+e+i$ $X_4=d+e+f$

The thus obtained values $X_1$, $X_2$, $X_3$, $X_4$ are compared with one another, and j (j is a natural number representing any of 1, 2, 3, 4) satisfying the following equation:

$X_j=_{max}(X_1, X_2, X_3, X_4)$ is calculated. If two or more of the values $X_1$, $X_2$, $X_3$, $X_4$ are equal to one another, the largest number j is adopted.

Figure 6:
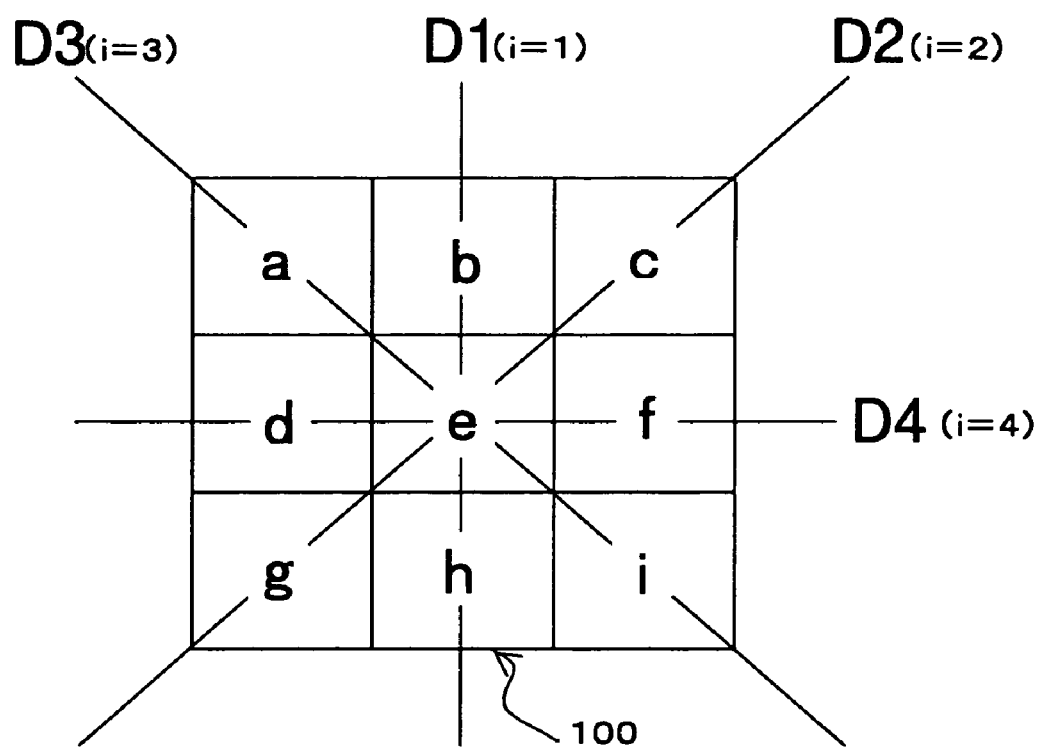
FIG. 6 is a diagram illustrating directions in which profiles extend.

Based on the thus obtained j, the direction-of-profile detection section 55 determines the profile direction Dj ($D_1$, $D_2$, $D_3$, $D_4$) passing over the note worthy pixel (pixel value e) as shown in FIG. 6. Specifically in the matrix 100, the direction passing along a string of the pixels b, e, h is designated as the profile direction $D_1$; the direction passing along a string of the pixels c, e, g, the profile direction $D_2$; the direction passing along a string of the pixels a, e, i, the profile direction $D_3$; the direction passing along a string of the pixels d, e, f, the profile direction $D_4$. From these profile directions $D_1$, $D_2$, $D_3$, $D_4$, a particular profile direction Dj is selected.

In the halftoning apparatus of the present embodiment, the two-dimensional digital filter dedicated to enhancing the profile is used to calculate the profile value E. The present invention should by no means be limited to this illustrated example, and various changes or modifications may be suggested without departing from the gist of the invention.

The technique will now be described in which the profile value E is calculated without the two-dimensional digital filter dedicated to enhancing the profile, simultaneously with detecting the profile direction. The alphabetical characters a through i designate the respective pixel values; like reference numbers designate similar parts or elements throughout several views, so their detailed description is omitted here.

(1) In the 3×3 matrix of FIG. 3, the following calculations (addition and subtraction) are made:

$X_1=a+d+g-b-e-h$ $X_2=c+f+i-b-e-h$ $X_3=a+b+d-c-e-g$ $X_4=f+h+i-c-e-g$ $X_5=b+c+f-a-e-i$ $X_6=d+g+h-a-e-i$ $X_7=a+b+c-d-e-f$ $X_8=g+h+i-d-e-f$ (2) $X_1$ through $X_8$ are examined one by one to find the maximum of them.

(3) Based on the result of (2), the profile direction is determined as follows:

a) If $X_1$ or $X_2$ is the maximum, the location and the direction of the profile are $D_1$ (FIG. 6).
  b) If $X_3$ or $X_4$ is the maximum, the location and the direction of the profile are $D_2$ (FIG. 6).
  c) If $X_5$ or $X_6$ is the maximum, the location and the direction of the profile are $D_3$ (FIG. 6).
  d) If $X_7$ or $X_8$ is the maximum, the location and the direction of the profile are $D_4$ (FIG. 6).

(4) The location and the direction of the profile at the time of detection of the maximum are stored in the RAM 16, the magnetic disc 26, or the like.

(5) The maximum of $X_1$ through $X_8$ obtained in (2) above is multiplied by 256/768 (=⅓). Then the result is rounded to the nearest whole number and stored in the RAM 16, the magnetic disc 26, or the like.

In this manner, the profile value E can be calculated by making addition and subtraction individually on the values of the noteworthy pixel and the adjacent pixels without the two-dimensional digital filter dedicated to enhancing the profile. Alternatively, the profile value E may be calculated without making any multiplication or division so that the load on the CPU 10 can be decreased, speeding up calculation of the profile value E and, at the same time, detecting the profile direction.

The value "256/768" by which the maximum of $X_1$ through $X_8$ is multiplied in (5) above will now be described.

In order to obtain the value $X_i$ (e.g., $X_1$), the value obtained by adding the values of three pixels is subtracted from that obtained by adding the values of the remaining three pixel values (a+d+g−b−e−h). As the pixel values a through i are in the range of from 0 to 255 (8 bits), the maximum and the minimum of $X_i$ (a+d+g−b−e−h) are 765 (=255×3) and 0, respectively.

To control the value $X_i$ using the 8-bit threshold T, the number by which $X_i$ is to be multiplied takes 256/(256×3=768) as a relatively small normalizing factor.

The error diffusing section 52 diffuses an error Z, which has occurred in the binary value with respect to the noteworthy pixel as the binarizing section 51 performs the binarizing, to unscanned pixels adjacent to the noteworthy pixel, where, Z=255−e (if e≧128)

Z=e (if e<128)

(e: the pixel value of the noteworthy pixel).

More specifically, the error diffusing section 52 diffuses the error Z to the unscanned pixels adjacent to the noteworthy pixel by one diffusion technique. The occurred error Z with respect to the noteworthy pixel is proportionally distributed to the plural unscanned pixels adjacent to the noteworthy pixel e in accordance with a weighting pattern (weighting factors) as of FIGS. 7 and 8.

Figure 7:
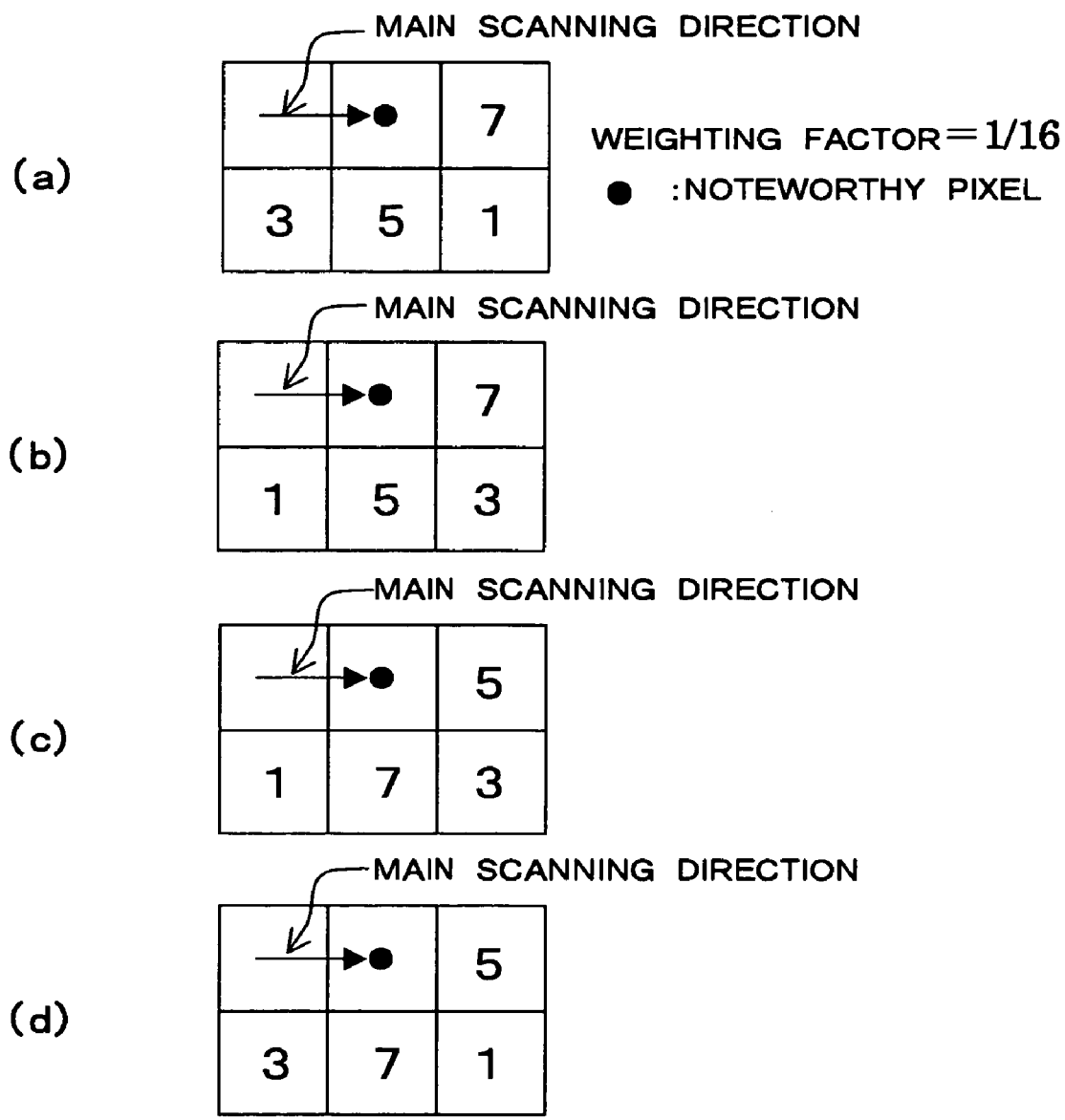
FIGS. 7, (a) through (d), is a diagram showing a weighting pattern according to an error diffusion technique.

FIG. 7, (a) through (d), shows the weighting pattern of the error diffusion technique: in what ratio the error Z with respect to the noteworthy pixel, which is designated by ● in each of (a) through (d) of FIG. 7, is distributed to the unscanned pixels adjacent to the noteworthy pixel, is shown.

The error diffusing based on the weighting pattern of FIG. 7(a) will now be described. For example, if the pixel value of the noteworthy pixel e=100 (e<128), the error Z=100; consequently 100×7/16 is added to an unscanned pixel (pixel value f in FIG. 3) neighboring the noteworthy pixel e in the primary scanning direction.

Likewise, 100×5/16 is added to another unscanned pixel (pixel value h in FIG. 3) neighboring the noteworthy pixel e in the secondary scanning direction (perpendicular to the primary scanning direction); 100×1/16, still another unscanned pixel (pixel value i in FIG. 3) neighboring the noteworthy pixel e in the primary scanning direction; 100×3/16, a further unscanned pixel (the pixel value g in FIG. 3) neighboring the noteworthy pixel e in the primary scanning direction. As a result, the occurred error is proportionally distributed (diffused) to the unscanned pixels adjacent to the noteworthy pixel.

In addition, the error diffusing section 52 has also other weighting patterns as of FIG. 7, (b) through (d) so that the error Z can be proportionally distributed to the unnscanned pixels adjacent to the noteworthy pixel based on these plural (4 in the present embodiment) types of weighting patterns, thus realizing the error diffusing.

Also when using the weighting patterns of FIG. 7, (b) through (d), the error diffusing section 52 performs the error diffusing in the same manner as when using the weighting pattern of FIG. 7(a).

Further, when the pixel-on-profile detection section 54 detects that the noteworthy pixel is a pixel constituting part of a profile of the multilevel input image, the error diffusing section 52 performs an exceptional process as described below.

As this exceptional process, values according to the occurred error Z are added to the values of the unscanned pixels along the profile in the detected direction, which is detected by the direction-of-profile detection section 54. Specifically, the error diffusing section 52 decides the profile direction Dj, which has been detected by the direction-of-profile detection section 54, and then performs the following processes in accordance with the decision.

(1) If the profile direction is $D_1$, Z/2 is added to the pixel value h.

(2) If the profile direction is $D_2$, Z/2 is added to the pixel value g.

(3) If the profile direction is $D_3$, Z/2 is added to the pixel value i.

(4) If the profile direction is $D_4$, Z/2 is added to the pixel value f.

In the present embodiment, the value obtained by dividing the error Z by 2 is added to the pixel value of the unscanned pixel along the profile direction. The present invention should by no means be limited to this, and various changes or modifications may be suggested without departing from the gist of the invention. As an alternative example, the value obtained by dividing the error Z by a number other than 2 may be added to the pixel value of the unscanned pixel along the profile in the detected direction in accordance with printing conditions such as the quality of ink (toner) or a printing medium to be used.

The error diffusing technique changing section 53 changes the technique of the error diffusing, which is currently used by the error diffusing section 52, to another in accordance with a predetermined way as the scanning of the successive pixels of the multilevel input image progresses. For example, the plural weighting patterns of FIG. 7, (a) through (d), are selectively changed from one to another in the sequence of (a), (b), (c), (d), (a), (b) . . . Namely, the error diffusing technique changing section 53 makes such change by changing the weighting pattern currently used in the error diffusing section 52 to another that is selected in the predetermined sequence. Alternatively the weighting patterns may be changed at random.

Furthermore, the error diffusing technique changing section 53 changes the error diffusion technique to another when the pixel-on-profile detection section 54 judges that the noteworthy pixel is a pixel as a part of the profile of the image (around the profile). Otherwise the error diffusing technique changing section 53 changes the error diffusion technique for every pixel.

The way of change of error diffusion technique by the error diffusing technique changing section 53 is exemplified by (1) changing the weighting pattern, and (2) changing the error diffusion technique itself; either changing way may be selected according to the need.

Figure 9:
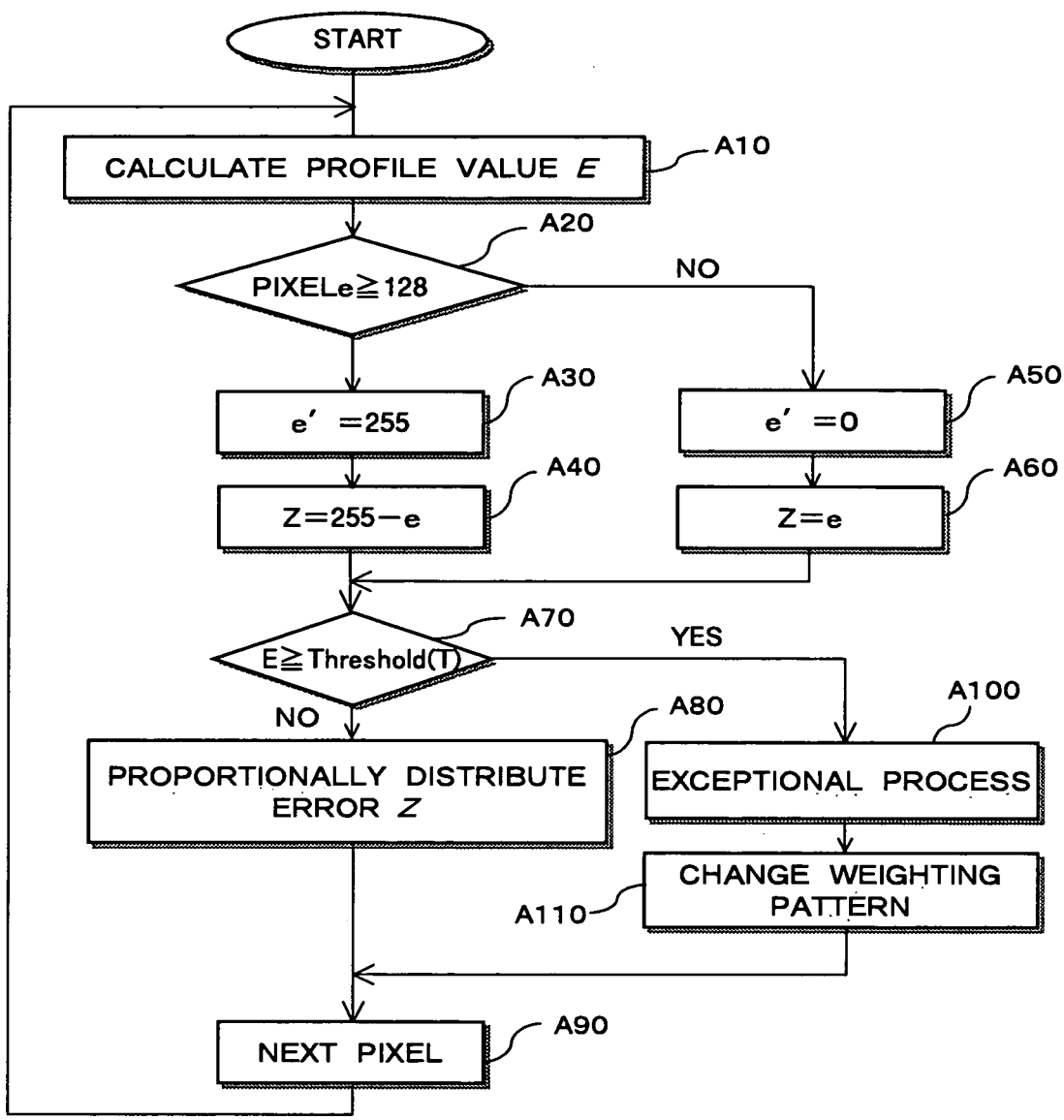
FIG. 9 is a flowchart illustrating the operation of the halftoning apparatus of the present embodiment to change the error diffusion technique across the profile.

The operation of the individual element or part of the halftoning apparatus of the present embodiment during the change of the error diffusion technique (weighting pattern) around the profile will now be described with reference to the flowchart of FIG. 9, steps A10 through A110.

First of all, the halftoning apparatus binarizes the multilevel image data expanded on the RAM 16 while scanning the image data using the matrix 100, which centers the noteworthy pixel, as shown in FIG. 3. At that time, in the matrix 100, the pixel-on-profile detection section 54 first calculates the profile value E with respect to the noteworthy pixel based on both the multilevel value of the noteworthy pixel and those of the adjacent pixels, by using the two-dimensional digital filter dedicated to enhancing the profile, such as the Laplacian filter of FIGS. 4, (*a*) and (*b*) or the Prewitt filter of FIGS. 5, (*a*) and (*b*) or by making addition and subtraction individually on the multilevel values of the noteworthy pixel and the adjacent pixels for direct calculation (step A1).

Then, the binarizing section 51 compares the pixel value e of the noteworthy pixel with the predetermined value (128 in the present embodiment) (step A20). If the pixel value e is equal to or larger than 128 (e≧128) (the YES route of step A20), 255 is recorded as the value of the noteworthy pixel e' in a predetermined area of the RAM 16 or the magnetic disc 26 (step A30).

And, 255–e is calculated, and the result of this calculation is recorded as the error Z in the predetermined area of the RAM 16 or the magnetic disc 26 (step A40).

Otherwise if the pixel value e is smaller than 128 (e<128) (the NO route of step A20), the binarizing section 51 records 0 as the pixel value e' of the noteworthy pixel in the predetermined area of the RAM 16 or the magnetic disc 26 (step A50) and the binarizing section 51 records the pixel value e of the noteworthy pixel as the error Z in the predetermined area of the RAM 16 or the magnetic disc 26 (step A60).

Next the pixel-on-profile detection section 54 compares the profile value E with a preset threshold T (step A70) If the profile value E is smaller than the threshold T (the NO route of the step A70), the error diffusing section 52 proportionally distributes the error Z to the plural unscanned pixels in accordance with the weighting pattern of the current error diffusion technique (step A80).

On the contrary, if the profile value E is equal to or larger than T (see the YES route of step A70), the exception process is carried out (step A100); namely, the profile direction $D_j$ is detected by the direction-of-profile detection section 55, and then the values (Z/2) corresponding to the occurred error are added to the pixel values of the unscanned pixels along profile in the detected direction.

After that, the error diffusing technique changing section 53 selectively changes the weighting pattern from one to another among the plural weighting patterns of FIG. 7, (*a*) through (*d*), (for example, in the sequence of (*a*), (*b*), (*c*), (*d*), (*a*), (*b*) . . . in FIG. 7) (step A110).

After completion of step A80 or A110, for the multilevel image data expanded on the RAM 16, the halftoning apparatus shifts the matrix 100 so as to center the next noteworthy pixel (the pixel adjacent to the current noteworthy pixel in the scanning direction) (step A90), and then returns to step A10 to repeat the same processes for a newly given noteworthy pixel.

In the present embodiment, as mentioned above, the change of the error diffusion technique by the error diffusing technique changing section 53 is made by selecting one from the plural weighting patterns of FIG. 7, (*a*) through (*d*) in the sequence of (*a*), (*b*), (*c*), (*d*), (*a*), (*b*) . . . Alternatively selection from the plural weighting patterns of FIG. 7, (*a*) through (*d*) may be at random.

In the halftoning apparatus of the present embodiment, the error diffusion technique changing section 53 changes the error diffusion technique only when the pixel-on-profile detection section 54 judges that the noteworthy pixel is a pixel on the profile of the input multilevel image. Alternatively the change of the error diffusion technique may be made for every pixel. As another alternative, a desired error diffusion technique (weighting pattern) may be selected from the plural candidates at random.

Figure 10:
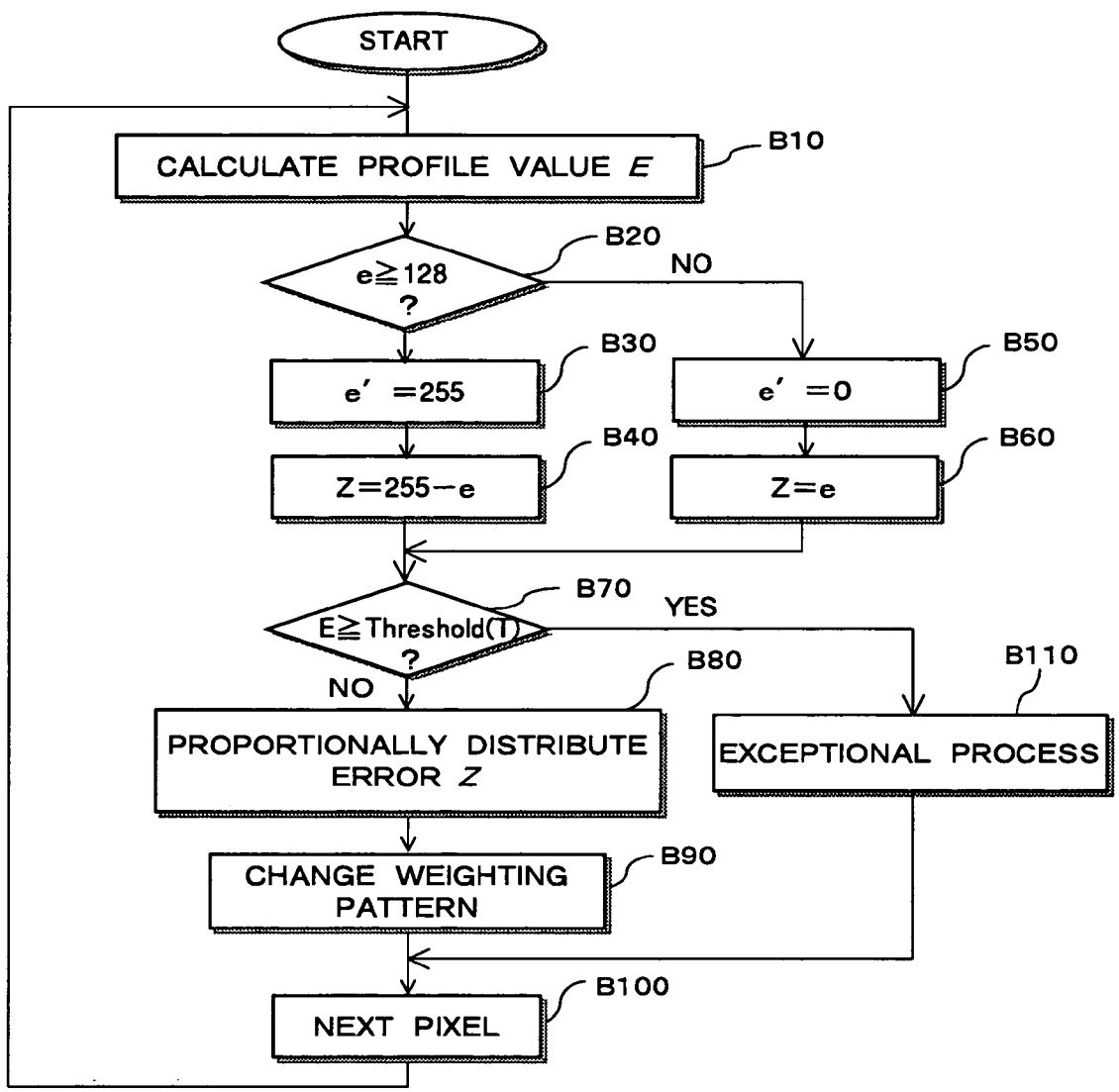
FIG. 10 is a flowchart illustrating the operation of the halftoning apparatus of the present embodiment to change the error diffusion technique for every pixel.

The operation of the individual element or part of the halftoning apparatus during the change of the error diffusion technique (weighting pattern) for every pixel will now be described with reference to the flowchart of FIG. 10, steps B10 through B110.

First of all, the half toning apparatus binarizes the multilevel image data expanded on the RAM 16 while scanning the image data using the matrix 100 of FIG. 3, which centers the noteworthy pixel. At that time, in the matrix 100, the pixel-on-profile detection section 54 first calculates the profile value E with respect to the noteworthy pixel based on both the multilevel value of the noteworthy pixel and those of the adjacent pixels, by using the two-dimensional digital filter dedicated to enhancing the profile, such as the Laplacian filter of FIGS. 4, (*a*) and (*b*) or the Prewitt filter (see FIGS. 5(*a*), (*b*)) or by making addition and subtraction individually on the multilevel values of the noteworthy pixel and the adjacent pixels for direct calculation (step B1).

Then the binarizing section 51 compares the pixel value e of the noteworthy pixel with the predetermined value (128 in the present embodiment) (step B20). If the pixel value e is equal to or larger than 128 (e≧128) (the YES route of step B20), 255 is recorded as the pixel value of the noteworthy pixel e' in a predetermined area of the RAM 16 or the magnetic disc 26 (step B30).

And, 255–e is calculated, and the result of this calculation is recorded as the error Z in the predetermined area of the RAM 16 or the magnetic disc 26 (step B40).

Otherwise if the pixel value e is smaller than 128 (e<128) (the NO route of step B20), the binarizing section 51 records 0 as the pixel value e' of the noteworthy pixel in the predetermined area of the RAM 16 or the magnetic disc 26 (step B50); and the binarizing section 51 records the pixel value e of the noteworthy pixel as the error Z in the predetermined area of the RAM 16 or the magnetic disc 26 (step B60).

Next the pixel-on-profile detection section 54 compares the profile value E with a preset threshold T (step B70). If the profile value E is smaller than the threshold T (the NO route of the step B70), the error diffusing section 52 proportionally distributes the error Z to the plural unscanned pixels in accordance with the weighting pattern of the current error diffusion technique (step B80).

After that, the error diffusing technique changing section 53 selectively changes the plural weighting patterns of (*a*) through (*d*) of FIG. 7 one after another (e.g., in the sequence of (*a*), (*b*), (*c*) (*d*), (*a*), (*b*) . . . ) (step B90).

On the contrary, if the profile value E is equal to or larger than T (see the YES route of step B70), the exception process is carried out (step B110); namely, the profile direction Dj is detected by the direction-of-profile detection section 55 and then the values (Z/2) corresponding to the occurred error are added to the pixel values of the unscanned pixels along the profile in the detected direction.

After completion of step B90 or B110, for the multilevel image data expanded on the RAM 16, the halftoning apparatus shifts the matrix 100 so as to center the next noteworthy pixel (step B100), and then returns to step B10 to repeat the same processes for a newly given noteworthy pixel.

As also mentioned above, the error diffusion technique (the weighting pattern) is changed for every pixel, thus minimizing moiré and artifacts in the binary image, which did not appear in the original (multilevel) image.

How to change the current error diffusion technique to another will now be described with reference to FIGS. 8, (*a*) and (*b*). (*a*) of FIG. 8 illustrates the weighting pattern of the error diffusion technique by Javis, Judice and Ninke, while (b) of FIG. 8 illustrates the error diffusion technique by Stucki.

Figure 8:
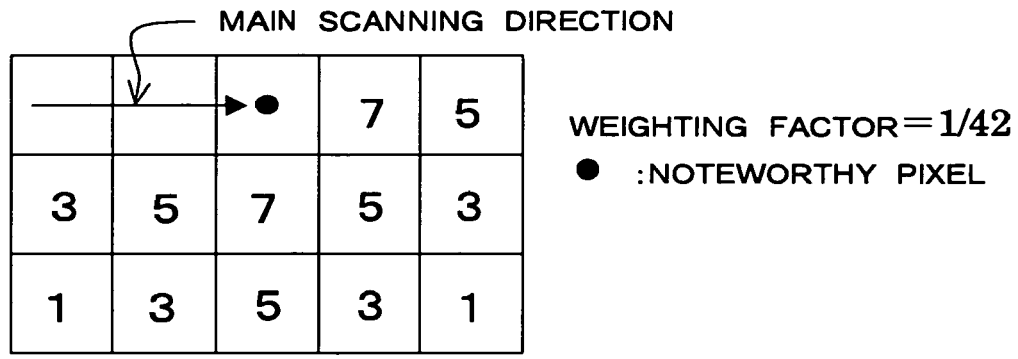
FIG. 8(a) is a diagram showing a weighting pattern according to Javis, Judice, and Ninke.
FIG. 8(b) is a diagram showing a weighting pattern according to Stucki.
Figure 8:
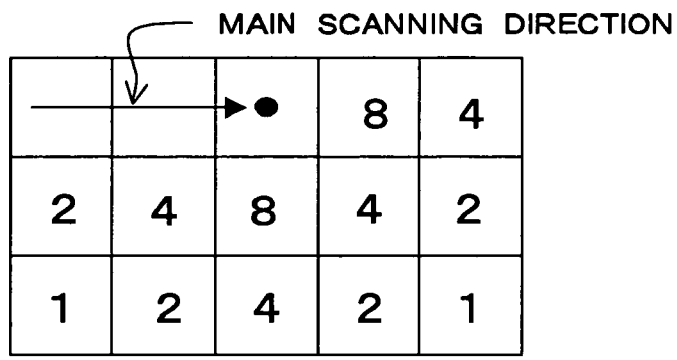

In these error diffusion techniques of FIGS. 8, (a) and (b), error Z proportionally distributes to the noteworthy pixel and the unscanned pixels adjacent to the noteworthy pixels. In these techniques the area of pixels to which the error Z is distributed is enlarged as compared to the error diffusion technique of FIGS. 7, (a) and (b).

The weighting pattern of (a) of FIG. 8 is known as the error diffusion technique of Javis, Judice and Ninkes, while that of (b) of FIG. 8 is known as the error diffusion technique of Stucki.

In these techniques, the error diffusing section 52 proportionally distributes (diffuses) the error Z using either the weighting pattern of (a) of FIG. 8 or that of (b) of FIG. 8. And the error diffusing technique changing section 53 changes the weighting patterns one another. The remaining processes are substantially identical with those illustrated in the flowchart of FIG. 9, steps A10 through A110.

Figure 11:
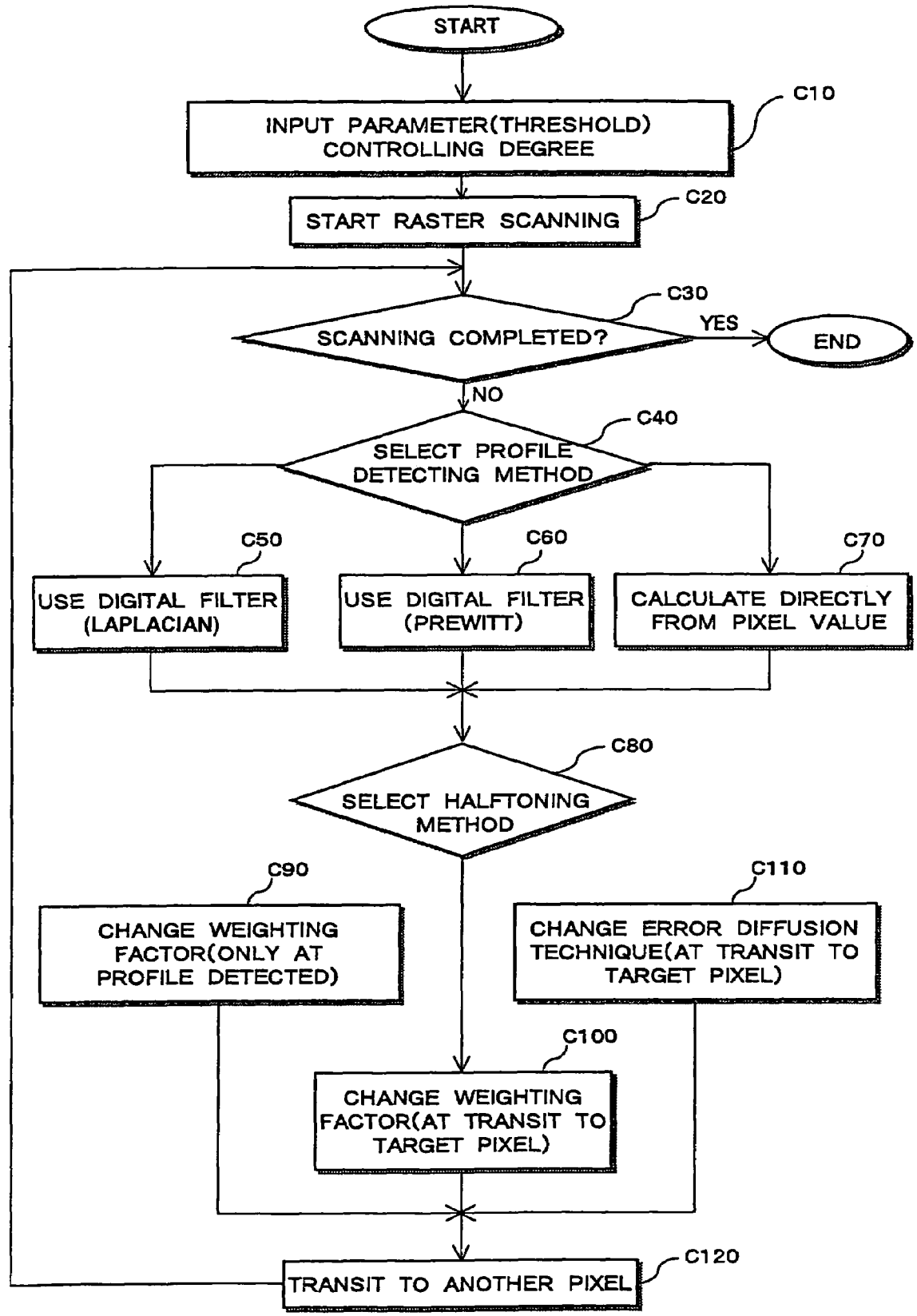
FIG. 11 is a flowchart illustrating the comprehensive operation of the halftoning apparatus of the present embodiment.

With this arrangement, scanning the pixels contained in the multilevel input image, the halftoning apparatus of the present embodiment converts (binarizes) the multilevel pixel values of the image data into the binary values for every noteworthy pixel being currently scanned. The operation of the halftoning apparatus will now be described with reference to the flowchart of FIG. 11, steps C10 through C120.

First of all, the operator inputs on the operation panel a threshold T as a preset parameter controlling the degree of profile enhancement (step C10), whereupon the halftoning apparatus starts raster scanning (step C20).

At that time, the binarizing may start from any of four pixels respectively located at four corners of the input image, and may progress in a desired direction.

Then discrimination is made whether or not the scanning has been completed (step C30); if the result of this discrimination is positive (the YES route of step C30) the operation of the halftoning apparatus is terminated.

Otherwise if the scanning is to be continued (the NO route of step C30), the halftoning apparatus selects one particular way from the plural profile detection ways; i.e. (1) using the two-dimensional digital filter dedicated to enhancing the profile, and (2) directly calculating from the pixel values (step C40). Alternatively the profile detection way may be selected by the operator.

Here, if a Laplacian filter (the two-dimensional digital filter dedicated to enhancing the profile) is selected to use, the profile value E is calculated using the Laplacian filter as mention above, and the obtained profile value E is compared with the threshold T for judgment that the noteworthy pixel being currently scanned is a pixel constituting part of the profile of the image (step C50).

Likewise, if a Prewitt filter (the two-dimensional digital filter dedicated to enhancing the profile) is selected to use, the profile value E is calculated using the Prewitt filter as mentioned above, and the obtained profile value E is compared with the threshold T for judgment that the noteworthy pixel being currently scanned is a pixel constituting part of the profile of the image (step C60).

When the direct calculation from the pixel values is selected, the profile value E is calculated by making addition and subtraction individually on the multilevel values of the noteworthy pixel and the adjacent pixels, and then the obtained profile value E is compared with the preset threshold T for judgment that the noteworthy pixel being currently scanned is a pixel constituting part of the profile of the image (step C70).

Next, the halftoning apparatus selects the method of halftoning (step C80). Specifically, a particular one is selected from the following three halftoning methods: with plural weighting patterns of the error diffusion technique provided in advance, (1) changing the weighting pattern only upon detection that the noteworthy pixel being currently scanned is a pixel on the profile of the image (only upon encountering of the profile); (2) changing the weighting patterns one to another for every pixel; and (3) changing the weighting pattern to that of another error diffusion technique as shown in (a) and (b) of FIG. 8.

If the method (1) above is selected (step C90), one identical weighting pattern is constantly used in halftoning the pixels lying between one profile and the other profile. At that time, the weighting pattern is preferably changed either in a predetermined sequence or at random.

Otherwise if the method (2) above is selected (step C100), the weighting pattern is changed for every pixel; at that time, the weighting pattern is preferably changed either in a predetermined sequence or at random.

Still otherwise if the method (3) is selected, the halftoning is performed using such error diffusion methods as shown in (a) and (b) of FIG. 8 (step C110) After that, for the multilevel image data expanded on the RAM 16, the halftoning apparatus shifts the matrix 100 so as to center the next noteworthy pixel (step C120), and then returns to step C30.

Subsequently the processes (step C10 through C120) are repeated until the raster scanning is completed.

Thus, according to the halftoning apparatus of the present embodiment, when the pixel-on-profile detection section 54 detects that the noteworthy pixel is contained in the profile of the input image, the error diffusing technique changing section 53 changes the error diffusion technique (weighting pattern) to another. It is therefore possible to localize the undesirable effects (moiré and artifacts), which have been presumably caused by changing the error diffusion technique, to dissolve into the profile, thus minimizing moiré and artifacts in the binary image, which did not appear in the original (multilevel) image.

Further, when the pixel-on-profile detection section 54 detects that the noteworthy pixel is contained in the profile of the input image, the error diffusing section 52 performs the exception process of adding the values (Z/2), in accordance with the error occurred with the binarizing of the noteworthy pixel, to the values of the unscanned pixels along the profile in the direction detected by the direction-or-profile detection section 55. It is accordingly possible to minimize moiré and artifacts in the binary image, which did not appear in the original (multilevel) image.

Still further, discrimination is made whether or not the noteworthy pixel is a pixel on the profile, by comparing the profile value E with respect to the noteworthy pixel, which is calculated based on the values of the noteworthy pixel and its adjacent pixels, to the threshold T (e.g., 128). Accordingly it is possible not only to facilitate detecting the profile but also to enable detecting the profile while scanning the multilevel image, realizing a high-speed profile detecting process.

Further, with the halftoning apparatus of the present embodiment, the operator can change the degree of profile enhancement (sharpness) in the binary image by changing the threshold T, thereby obtaining printed matter devoid of a blur, which would have been caused in the conventional halftoning.

For example, the closer the threshold T to 255, the more the profile will be enhanced; the closer the threshold T to 0, the more the profile will be blurred.

Furthermore, the pixel-on-profile detection section 54 employs the two-dimensional filter dedicated to enhancing the profile, such as a Laplacian filter or a Prewitt filter to calculate the profile value, thus facilitating detection of the profile.

In addition, as the error diffusing section 52 proportionally distributes the occurred error to the plural (4 in the present embodiment) unscanned pixels adjacent to the noteworthy pixel based on the weighting patterns as shown in (a) trough (d) of FIG. 7, the error diffusing technique changing section 53 selects one from the candidate weighting patterns in the sequence of (a), (b), (c), (d), (a), (b) ... in FIG. 7. Thus selection of the error diffusion technique is made by changing the weighting pattern to be used by the error diffusing section 52 in the predetermined sequence, thus minimizing moiré and artifacts in the binary image, which did not appear in the original (multilevel) image.

Moreover, as the error diffusing section 52 proportionally distributes the occurred error to the plural unscanned pixels adjacent to the noteworthy pixel based on the weighting patterns as shown in (a) trough (d) of FIG. 7, the error diffusing technique changing section 53 changes the weighting pattern to another as selected at random from the above weighting patterns, thus minimizing moiré and artifacts in the binary image, which did not appear in the original (multilevel) image.

Figure 12:
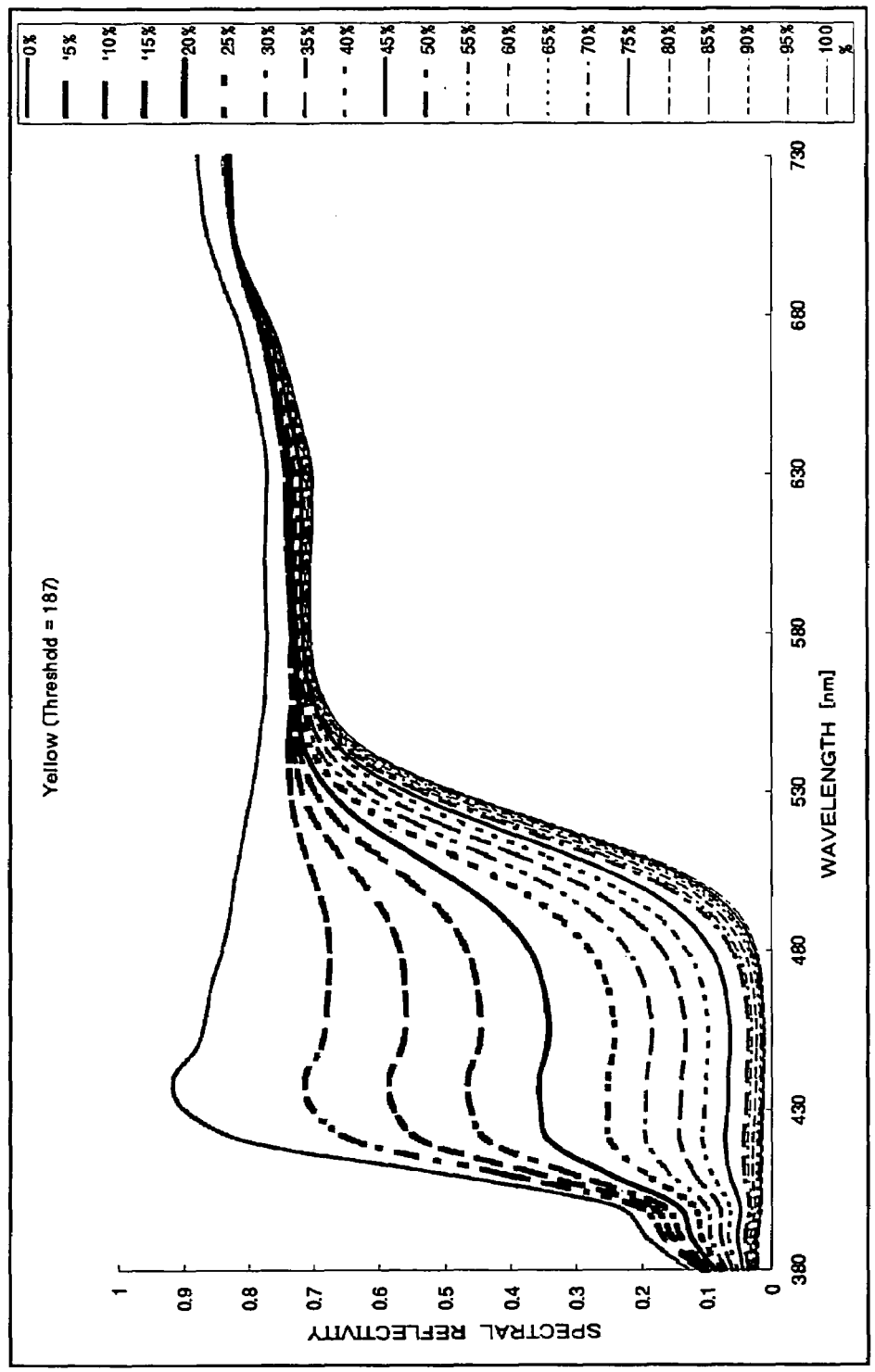
FIG. 12 is a graph showing the relation between wavelengths and spectral reflectivities for yellow.
Figure 13:
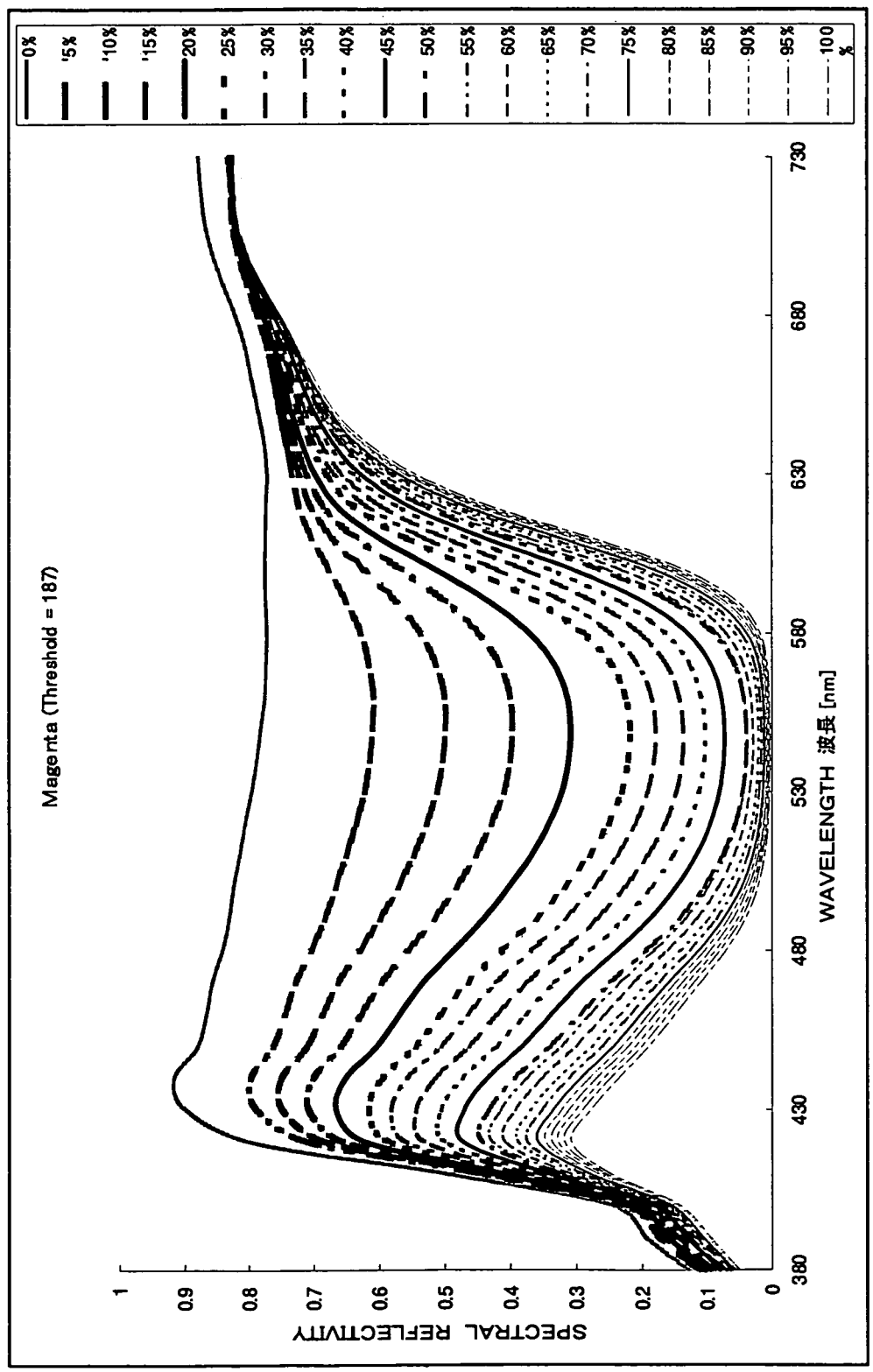
FIG. 13 is a graph showing the relation between the wavelengths and the spectral reflectivities for magenta.
Figure 14:
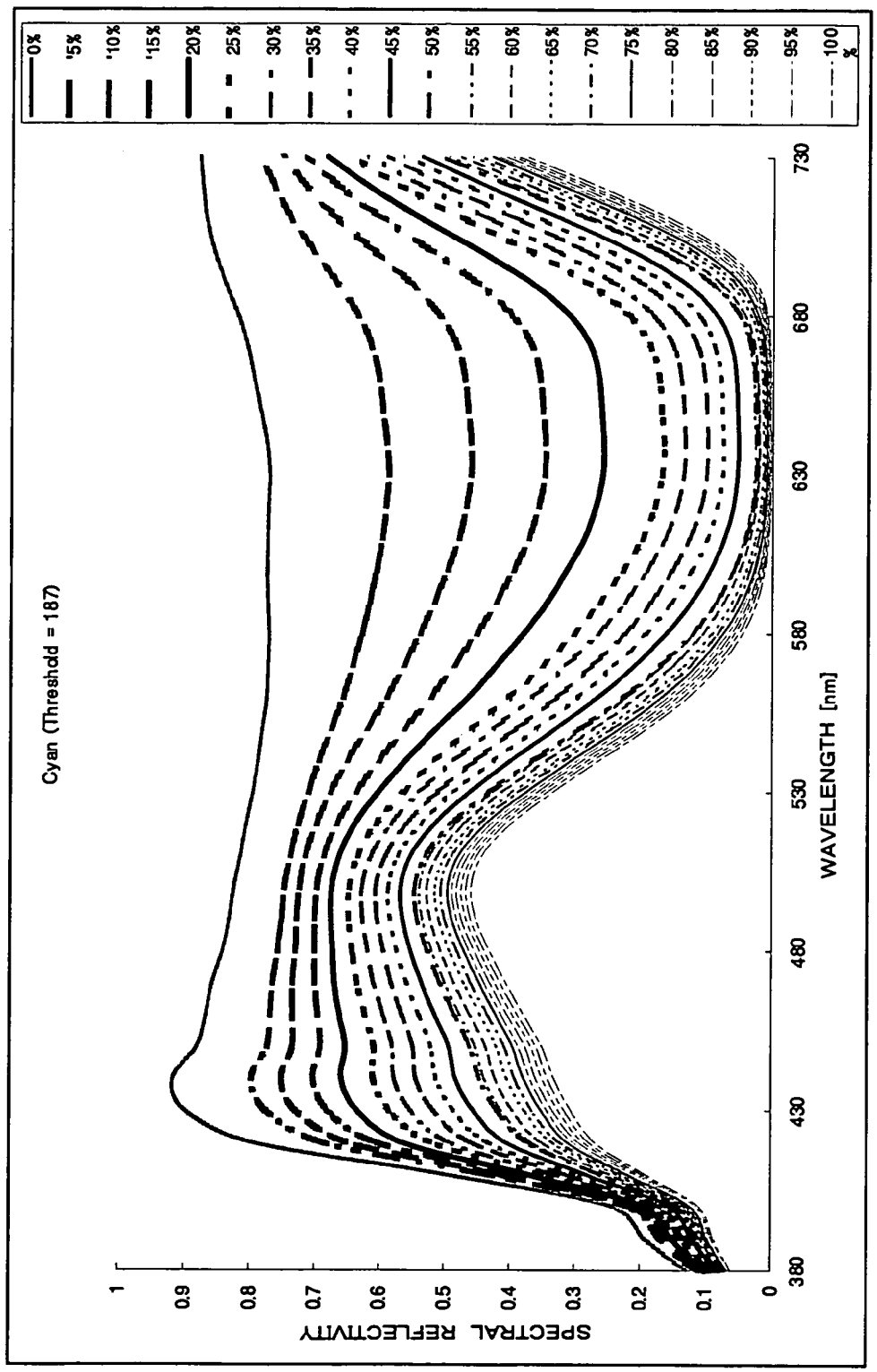
FIG. 14 is a graph showing the relation between the wavelengths and the spectral reflectivities for cyan.

FIGS. 12 through 14 are graphs each showing the spectral reflectivities of color chips of the image halftoned by the halftoning apparatus of the present embodiment; these spectral relectivites were output for every 5% throughout the range of from 0% to 100%. FIG. 12 shows the relation between wavelengths and spectral reflectivities of yellow; FIG. 13, the relation in connection with magenta; FIG. 14, the relation in connection with cyan.

In the halftoning process shown in FIGS. 12 through 14, the threshold T=187 is employed in the profile detection, and the weighting patterns are randomly changed for every pixel using the same error diffusion technique.

As shown in FIGS. 12 through 14, according to the apparatus and the method of halftoning of the present embodiment, as the spectral reflectivities of signals change in color, the hue is maintained but the brightness is varied; this is, the gradation of shade is preserved without being coated.

When the multilevel image to be binarized is constituted with a plurality of images (e.g., a color image composed of a plurality of color separations such as cyan, magenta, yellow, and black) to be halftoned, sharing an approximate profile, the pixel-on-profile detection section 54 may discriminate whether or not the noteworthy pixel is a pixel on the profile for only one of the plural images; and the result of this discrimination is temporarily stored in the RAM 16 or the magnetic disc 26, and the profile information (location or direction of the profile) may be used in halftoning all the images.

All the plural images can be thereby halftoned without the need for the pixel-on-profile detection section 54 to perform the pixel-on-profile detection for the remaining images, thus speeding up the halftoning process.

The plural images constituting the color image should by no means be limited to cyan, magenta, yellow, and black as described above, but they may be red, green, and blue; other color separations also are applicable. Also any combination of colors constituting a color image is applicable.

At that time, the binarizing all the images may be performed after completion of the profile detection or simultaneously with it.

Further, in the halftoning apparatus of the present embodiment, as the multilevel image is scanned, the pixel-on-profile detection section 54 calculates the profile value E to discriminate whether or not the noteworthy pixel is a pixel on the profile, simultaneously with the binarizing performed by the binarizing section 51, thus reducing the time needed for halftoning.

Since the halftoning method of the present embodiment is suitable for an parallel processing operation, parallel processing using plural CPUs can be realized, thus speeding up the halftoning processes of a huge amount of image data.

When the pixel-on-profile detection section 54 carries out the profile detection, any one technique may be employed as selected from (1) using a Laplacian filter, (2) using a Prewitt filter, and (c) making addition and subtraction on the pixel values of the noteworthy pixel and the adjacent pixels.

Furthermore, the present invention should by no means be limited to these embodiments, and various changes and modifications may be made without departing from the gist of the invention.

For example, in profile detection by the pixel-on-profile detection section 54, other techniques than those used in the present embodiment may be used with the same results.

And to calculate the profile value E by making addition and subtraction on the pixel values of the noteworthy pixel and the adjacent pixels, $X_i$ is multiplied by 256/768 (=⅓). The number by which $X_i$ is to be multiplied should by no means be limited to this illustrated example "256/768 (=⅓)".

What is claimed is:

1. A halftoning method of converting a multilevel input image into a binary image, comprising:
    converting the multilevel value of a given noteworthy pixel of the multilevel input image into a binary value while pixels of the multilevel input image are scanned successively;
    diffusing a possible error, which has occurred in binary value with respect to the noteworthy pixel, to unscanned pixels adjacent to the noteworthy pixel by one diffusion technique;
    changing the technique of said diffusing to another in accordance with a predetermined manner as the scanning of the successive pixels of the multilevel input image progresses;
    discriminating whether or not the noteworthy pixel is a pixel constituting part of a profile of the multilevel input image; and
    detecting the direction in which the profile of the multilevel input image extends with respect to the noteworthy pixel, wherein
    if the result of said discriminating is positive, said changing comprises changing the error diffusion technique from one to another, and values according to the occurred error are added to the values of the unscanned pixels along the detected direction of the profile as an exceptional process.

2. The halftoning method according to claim 1, wherein the error diffusion technique is changed for every pixel of the multilevel input image.

3. The halftoning method according to claim 2,
    wherein said profile discriminating is carried out by calculating a profile value of the noteworthy pixel based on both the multilevel value of the noteworthy pixel and those of the adjacent pixels, and comparing the calculated profile value with a predetermined value.

4. The halftoning method according to claim 3, wherein a two-dimensional digital filter dedicated to enhancing the profile is used in said calculating of the profile value.

5. The halftoning method according to claim 4, wherein said two-dimensional digital filter dedicated to enhancing the profile is a Laplacian filter.

6. The halftoning method according to claim 4, wherein said two-dimensional digital filter dedicated to enhancing the profile is a Prewitt filter.

7. The halftoning method according to claim 3, wherein the profile value is directly calculated by making addition and subtraction individually on the multilevel values of the noteworthy pixel and the adjacent pixels.

8. The halftoning method according to claim 2, wherein if a plurality of multilevel input images to be halftoned have an approximate profile, said discriminating is carried out for only one of the plural multilevel input images, and the result of said discriminating is used in halftoning the remaining multilevel input images.

9. The halftoning method according to claim 1, wherein said profile discriminating is carried out by calculating a profile value of the noteworthy pixel based on both the multilevel value of the noteworthy pixel and those of the adjacent pixels, and comparing the calculated profile value with a predetermined value.

10. The halftoning method according to claim 9, wherein a two-dimensional digital filter dedicated to enhance the profile is used in said calculating of the profile value.

11. The halftoning method according to claim 10, wherein said two-dimensional digital filter dedicated to enhancing the profile is a Laplacian filter.

12. The halftoning method according to claim 10, wherein said two-dimensional digital filter dedicated to enhancing the profile is a Prewitt filter.

13. The halftoning method according to claim 9, wherein the profile value is directly calculated by making addition and subtraction individually on the multilevel values of the noteworthy pixel and the adjacent pixels.

14. The halftoning method according to claim 1,
wherein in said error diffusing, the one error diffusion technique is a technique of proportionally distributing the occurred error to the plural unscanned pixels adjacent to the noteworthy pixel in accordance with a predetermined weighting pattern,
wherein the changing of the error diffusing technique comprises selecting a changing technique from a group of techniques consisting of changing the error diffusion technique for every pixel of the multilevel input image, changing the error diffusion technique to another selected in a predetermined order from a plurality of error diffusion techniques, changing the error diffusion technique to another selected at random from a plurality of error diffusion techniques, and changing said predetermined weighting pattern to another, and
wherein said profile discriminating is carried out by calculating a profile value of the noteworthy pixel based on both the multilevel value of the noteworthy pixel and those of the adjacent pixels, and comparing the calculated profile value with a predetermined value.

15. The halftoning method according to claim 14, wherein a two-dimensional digital filter dedicated to enhancing the profile is used in said calculating of the profile value.

16. The halftoning method according to claim 15, wherein said two-dimensional digital filter dedicated to enhancing the profile is a Laplacian filter.

17. The halftoning method according to claim 15, wherein said two-dimensional digital filter dedicated to enhancing the profile is a Prewitt filter.

18. The halftoning method according to claim 14, wherein the profile value is directly calculated by making addition and subtraction individually on the multilevel values of the noteworthy pixel and the adjacent pixels.

19. The halftoning method according to claim 1, wherein in said changing comprises changing the error diffusion technique to another that is selected in a predetermined order from a plurality of error diffusion techniques.

20. The halftoning method according to claim 1, wherein in said changing comprises changing the error diffusion technique to another that is selected at random from a plurality of error diffusion techniques.

21. The halftoning method according to claim 1, wherein
in said error diffusing, the one error diffusion technique is a technique of proportionally distributing the occurred error to the plural unscanned pixels adjacent to the noteworthy pixel in accordance with a predetermined weighting pattern, and
in said technique changing, the error diffusion technique is changed by changing said predetermined weighting pattern to another.

22. The halftoning method according to claim 1, wherein if a plurality of multilevel input images to be halftoned have an approximate profile, said discriminating is carried out for only one of the plural multilevel input images, and the result of said discriminating is used in halftoning the remaining multilevel input images.

23. A halftoning apparatus converting a multilevel input image into a binary image, comprising:
a binarizing section converting the multilevel value of a given noteworthy pixel of the multilevel input image into a binary value while pixels of the multilevel input image are scanned successively;
an error diffusing section diffusing a possible error, which has occurred in binary value with respect to the noteworthy pixel, to unscanned pixels adjacent to the noteworthy pixel by one diffusion technique;
an error diffusion technique changing section changing said one diffusion technique of said diffusing to another in accordance with a predetermined manner as the scanning of the successive pixels of the multilevel input image progresses;
a pixel-on-profile detection section discriminating whether or not the noteworthy pixel is a pixel constituting part of a profile of the multilevel input image; and
a direction-of-profile detection section detecting the direction in which the profile of the multilevel input image extends with respect to the noteworthy pixel, wherein
if the result of said discriminating is positive, said error diffusion technique changing section changes the error diffusion technique from one to another and said error diffusion section performs an exceptional process of adding values according to the occurred error to the values of the unscanned pixels along the detected direction of the profile.

24. The halftoning apparatus according to claim 23, wherein said error diffusion technique changing section changes the error diffusion technique for every pixel of the multilevel input image.

25. A computer-readable recording medium in which a halftoning program instructs a computer to execute a function of converting a multilevel input image into a binary image is recorded, wherein said halftoning program instructs the computer to function as follows:

- a binarizing section converting the multilevel value of a given noteworthy pixel of the multilevel input image into a binary value while pixels of the multilevel input image are scanned successively;
- an error diffusing section diffusing a possible error, which has occurred in binary value with respect to the noteworthy pixel, to unscanned pixels adjacent to the noteworthy pixel by one diffusion technique;
- an error diffusion technique changing section changing said one diffusion technique of said diffusing to another in accordance with a predetermined manner as the scanning of the successive pixels of the multilevel input image progresses;
- a pixel-on-profile detection section for discriminating whether or not the noteworthy pixel is a pixel constituting part of a profile of the multilevel input image; and
- a direction-of-profile detection section detecting the direction in which the profile of the multilevel input image extends with respect to the noteworthy pixel, wherein
- if the result of said discriminating is positive, said halftoning program instructs the computer in such a manner that said error diffusion technique changing section changes the error diffusion technique from one to another and said error diffusion section performs an exceptional process of adding values according to the occurred error to the values of the unscanned pixels along the detected direction of the profile.

26. The computer-readable recording medium according to claim 25, wherein said halftoning program instructs the computer in such a manner that said error diffusion technique changing section changes the error diffusion technique for every pixel of the multilevel input image.

* * * * *